(12) United States Patent
Matsuda

(10) Patent No.: US 11,149,170 B2
(45) Date of Patent: Oct. 19, 2021

(54) HOT MELT ADHESIVE AGENT FOR CONTAINER WITH STRAW

(71) Applicant: HENKEL AG & CO. KGAA, Duesseldorf (DE)

(72) Inventor: Kenji Matsuda, Osaka (JP)

(73) Assignee: Henkel AG & Co. KGaA

( * ) Notice: Subject to any disclaimer, the term of this patent is extended or adjusted under 35 U.S.C. 154(b) by 0 days.

(21) Appl. No.: 16/281,244

(22) Filed: Feb. 21, 2019

(65) Prior Publication Data

US 2019/0185718 A1  Jun. 20, 2019

Related U.S. Application Data

(63) Continuation of application No. PCT/JP2017/024941, filed on Jul. 7, 2017.

(30) Foreign Application Priority Data

Aug. 23, 2016  (JP) .................. 2016-162564

(51) Int. Cl.
| | |
|---|---|
| *C09J 5/06* | (2006.01) |
| *C09J 11/08* | (2006.01) |
| *C09J 11/06* | (2006.01) |
| *C09J 123/16* | (2006.01) |
| *C09J 123/14* | (2006.01) |
| *B65D 77/28* | (2006.01) |
| *C09J 123/08* | (2006.01) |

(52) U.S. Cl.
CPC ............... *C09J 5/06* (2013.01); *B65D 77/28* (2013.01); *C09J 11/06* (2013.01); *C09J 11/08* (2013.01); *C09J 123/0815* (2013.01); *C09J 123/14* (2013.01); *C09J 123/142* (2013.01); *C09J 123/16* (2013.01); *C08L 2205/025* (2013.01); *C08L 2205/03* (2013.01); *C08L 2207/14* (2013.01); *C09J 2423/10* (2013.01); *C09J 2423/16* (2013.01)

(58) Field of Classification Search
CPC ..... C09J 5/06; C09J 11/08; C09J 11/06; C09J 123/16; C09J 123/14; B65B 77/28
USPC .......................................................... 524/270
See application file for complete search history.

(56) References Cited

U.S. PATENT DOCUMENTS

| | | | | |
|---|---|---|---|---|
| 2009/0203847 | A1* | 8/2009 | Ellis ...................... | C08L 23/04 |
| | | | | 525/221 |
| 2011/0021103 | A1* | 1/2011 | Alper ..................... | B32B 27/32 |
| | | | | 442/329 |
| 2012/0329353 | A1 | 12/2012 | Davis et al. | |
| 2015/0259578 | A1* | 9/2015 | Jones ..................... | C09J 131/04 |
| | | | | 524/524 |

FOREIGN PATENT DOCUMENTS

| | | |
|---|---|---|
| JP | 5-162752 A | 6/1993 |
| JP | 7-257650 A | 10/1995 |
| JP | 9-278066 A | 10/1997 |
| JP | 516752 B2 | 3/2013 |
| RU | 2585640 C2 | 5/2016 |
| WO | 2005/049754 A1 | 6/2005 |
| WO | 2009100414 A1 | 8/2009 |
| WO | 2013019507 A2 | 2/2013 |
| WO | 2015138215 A1 | 9/2015 |
| WO | 2016073868 A1 | 5/2016 |

\* cited by examiner

*Primary Examiner* — Deve V Hall
(74) *Attorney, Agent, or Firm* — Sun Hee Lehmann

(57) ABSTRACT

To provide a hot melt adhesive agent which is excellent in adhesive properties to a substrate material such as paper and a polyolefin, is also excellent in adhesive properties from a low temperature (around 4° C.) to a high temperature (around 50° C.), has little viscosity change even when a long time elapses, and has tack that is not too high. Provided is a hot melt adhesive agent for a container with a straw comprising an amorphous poly-α-olefin (A) and a metallocene polymer (B).

4 Claims, 1 Drawing Sheet

HOT MELT ADHESIVE AGENT FOR CONTAINER WITH STRAW

FIELD OF THE INVENTION

The present invention relates to a hot melt adhesive agent for a container with a straw. More specifically, the present invention relates to a hot melt adhesive agent which makes a plastic film packaging a straw adhere to a container (for example, a container made of paper, that made of metal and that made of plastic) in which a liquid such as a beverage is filled.

BACKGROUND OF THE INVENTION

A container with a straw refers to a container to which a packaging body for a straw, which is obtained by housing a straw for suction into a packaging bag made of plastic, is attached. In general, the container with the straw is often filled with a beverage. The container with the straw is classified based on a material for manufacturing the container. When a container is made of paper, the container is called a paper pack, when a container is made of metal, the container is called a (metal) can (more specifically, when a container is made of aluminum, the container is called an aluminum can, and when a container is made of steel, the container is called a steel can), and when a container is made of plastic, for example, is made of a polypropylene and is made of a polyethylene terephthalate, the container is called a plastic cup.

Patent Document 1 describes a (metal) can with a straw, and Patent Document 2 discloses a paper pack with a straw. Both Documents describe that a packaging body for a straw is made to adhere to a container by using a hot melt adhesive agent.

The hot melt adhesive agent disclosed in Patent Document 1 is a hot melt adhesive agent which is based on a styrene-butadiene-styrene block copolymer (SBS), a styrene-isoprene-styrene block copolymer (SIS), a styrene-ethylene/butylene-styrene block copolymer (SEBS) or a styrene-ethylene/propylene-styrene block copolymer (SEPS) (see [Claim 1] and [Examples] of Patent Document 1).

The hot melt adhesive agent of Patent Document 1 is a styrene-based hot melt adhesive agent, which is capable of being suitably used for attaching a packaging body for a straw to a container made of metal. However, adhesive properties of the adhesive agent to a container made of paper are not sufficient, and the adhesive properties of the adhesive agent for making the packaging body for the straw adhere to the container made of paper are insufficient.

Patent Document 2 describes that a packaging body for a straw is fixed to a container by using a hot melt adhesive agent (see the paragraph [0010] of Patent Document 2).

However, from Patent Document 2, the composition of the hot melt adhesive agent to be used is completely unclear.

It is required for a hot melt adhesive agent for a container with a straw to be excellent in adhesive properties to a plastic film such as a polyolefin for packaging a straw and to a substrate material, for example, paper and plastic substrate materials to be used for manufacturing the container.

Since it is considered that a container with a straw is refrigerated in summer, and is left at ambient temperature, it is required for a hot melt adhesive agent to be excellent in adhesive properties in a broad temperature range from a low temperature (around 4° C.) to a high temperature (around 50° C.). In some cases, a container with a straw is manufactured over a long period of time, and a hot melt adhesive agent is kept in a high temperature (around 180° C.) state in a tank which is connected to a coater (a coating machine) until the hot melt adhesive agent is coated on a substrate material. Accordingly, it is required for a hot melt adhesive agent to be capable of maintaining viscosity at a high temperature for a long period of time.

In addition, it is required for a hot melt adhesive agent to be excellent in resistance to blocking. When a hot melt adhesive agent which is protruded from an adhesion surface between a packaging body for a straw and a substrate material of a container is tacky, a consumer may sometimes feel discomfort when he/she touches the hot melt adhesive agent.

As described above, it is required for a hot melt adhesive agent for a container with a straw to have various properties which are suitable for use in a beverage container, but no hot melt adhesive agent that completely satisfies demands of consumers has been found.

[Patent Document 1] Japanese Patent Laid-open Publication No. H5 (1993)-162752

[Patent Document 2] Japanese Patent Laid-open Publication No. H9 (1997)-278066

SUMMARY OF THE INVENTION

An object of the present invention is to provide a hot melt adhesive agent which is excellent in adhesive properties to a substrate material such as paper and a polyolefin, is also excellent in adhesive properties from a low temperature (around 4° C.) to a high temperature (around 50° C.), has little viscosity change even when a long time elapses, and has tack that is not too high.

The present inventor has found that, as a result of keen research, a hot melt adhesive agent comprising a specific olefin polymer is surprisingly capable of solving the above-described problems, and thus has completed the present invention.

The present invention and aspects of the present invention are as follows.

1. A hot melt adhesive agent for a container with a straw comprising an amorphous poly-α-olefin (A) and a metallocene polymer (B).

2. The hot melt adhesive agent for the container with the straw according to the item 1, further comprising a tackifying resin (C) and a wax (D).

3. The hot melt adhesive agent for the container with the straw according to the item 1 or 2, further comprising an oil (E).

4. The hot melt adhesive agent for the container with the straw according to the item 3, comprising from 5 to 30 parts by weight of the tackifying resin (C) based on 100 parts by weight of a total weight of (A) to (E).

5. The hot melt adhesive agent for the container with the straw according to any one of the items 1 to 4, wherein the amorphous poly-α-olefin (A) has a chemical structure derived from propylene.

6. The hot melt adhesive agent for the container with the straw according to any one of the items 1 to 5, wherein the metallocene polymer (B) comprises a crystalline polypropylene homopolymer.

7. A container with a straw, to which a straw is retained by the hot melt adhesive agent according to any one of the items 1 to 6.

The hot melt adhesive agent according to the present invention comprises an amorphous poly-α-olefin (A) and a metallocene polymer (B), and therefore, is excellent in adhesive properties to a substrate material such as paper and a polyolefin, is also excellent in adhesive properties from a low temperature (around 4° C.) to a high temperature (50° C.), and makes it possible to cause little viscosity change even when being stored in a tank at a high temperature for a long period of time.

When a container with a straw is manufactured by using the hot melt adhesive agent according to the present invention, adhesive properties are capable of being kept even when the container with the straw is refrigerated or is left outdoors.

Tack of the hot melt adhesive agent according to the present invention is not too high. Accordingly, a consumer does not feel "tackiness" caused by the adhesive agent protruded from an adhesion surface between a container and a packaging body for a straw, and then does not feel uncomfortable.

The hot melt adhesive agent according to the present invention is capable of keeping constant viscosity for a long period of time. Accordingly, even when a container with a straw is manufactured for a long period of time, no viscosity control of the hot melt adhesive agent is required, and it is possible to proceed coating work efficiently.

DETAILED DESCRIPTION OF THE INVENTION

Figure 1:
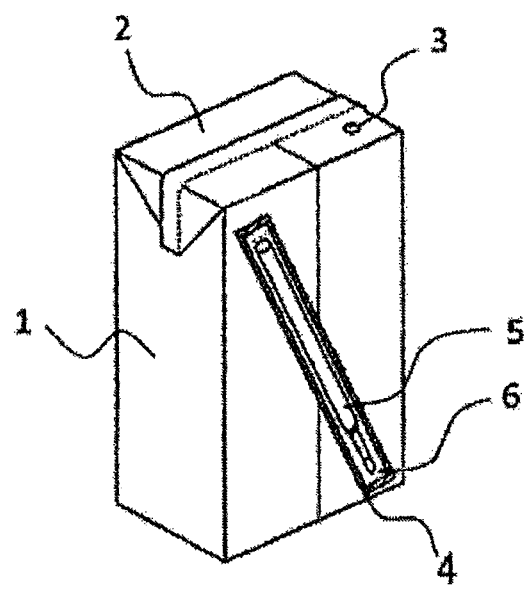
FIG. 1 is a perspective view which schematically shows a container with a straw (a paper pack).

The hot melt adhesive agent according to the present invention comprises an amorphous poly-α-olefin (A) and a metallocene polymer (B).

<Amorphous Poly-α-Olefin (A)>

In the present invention, "an amorphous poly-α-olefin (A) (hereinafter also referred to as "a component (A)")" is an amorphous polymer of an α-olefin which is generally called an amorphous poly-α-olefin. The amorphous poly-α-olefin (A) is not particularly limited as long as the hot melt adhesive agent according to the present invention is capable of being obtained.

In this regard, "amorphous" means, normally, not being crystalline, but more specifically, refers to a state in which molecular chains of a polymer are randomly arranged. By compounding a hot melt adhesive agent with an amorphous poly-α-olefin (A), it becomes possible that the hot melt adhesive agent exhibits an appropriate value of tack, is excellent in adhesive properties in a broad temperature range from a low temperature (around 4° C.) to a high temperature (around 50° C.), and has little viscosity change even when being stored in a tank at a high temperature for a long period of time.

Examples of the amorphous poly-α-olefin (A) include an amorphous polypropylene, an amorphous polyethylene or an amorphous copolymer of propylene and another α-olefin and an amorphous copolymer of ethylene and another α-olefin.

Specific examples of the amorphous poly-α-olefin (A) include a polypropylene (homopolymer), a propylene/ethylene copolymer, a propylene/1-butene copolymer, a terpolymer of propylene/ethylene/1-butene, a terpolymer of propylene/1-hexene/1-octene, a terpolymer of propylene/1-hexene/methyl pentene and a 1-polybutene (homopolymer).

In the present invention, it is preferable that the amorphous poly-α-olefin (A) has a chemical structure derived from propylene. The meaning of the chemical structure derived from propylene includes both pure propylene and a propylene derivative which has a functional group other than propylene. When the hot melt adhesive agent according to the present invention includes the chemical structure derived from propylene, the hot melt adhesive agent becomes more excellent in adhesive properties in a broad temperature range from a low temperature (around 4° C.) to a high temperature (around 50° C.).

Examples of a preferable form of the amorphous poly-α-olefin (A) include a propylene/ethylene/1-butene. By compounding the hot melt adhesive agent according to the present invention with a propylene/ethylene/1-butene, the hot melt adhesive agent becomes more excellent in adhesive strength in a broad temperature range from a low temperature (around 4° C.) to a high temperature (around 50° C.), and exhibits less viscosity change.

It is especially preferable that the amorphous poly-α-olefin (A) includes not only a propylene/ethylene/1-butene but also a polypropylene homopolymer. Owing to inclusion of a polypropylene in the hot melt adhesive agent, hardness of the hot melt adhesive agent becomes appropriate, and therefore, resistance to blocking of the hot melt adhesive agent improves further, and then, the hot melt adhesive agent becomes more excellent in balance of adhesive forces in a wide range from a low temperature (around 4° C.) to a high temperature (around 50° C.).

In the present invention, a density of the amorphous poly-α-olefin (A) is preferably equal to or lower than 1.00 g/cm$^3$, is especially preferably from 0.80 g/cm$^3$ to 0.90 g/cm$^3$, and is most preferably from 0.85 g/cm$^3$ to 0.88 g/cm$^3$.

Owing to the density of the amorphous poly-α-olefin (A) being in the above-described ranges, hardness of the hot melt adhesive agent according to the present invention becomes appropriate, and resistance to blocking of the hot melt adhesive agent improves.

<Metallocene Polymer (B)>

In the present invention, "a metallocene polymer (B) (hereinafter also referred to as "a component (B)")" represents a crystalline polymer of an α-olefin which is manufactured by using a metallocene catalyst as a polymerization catalyst, that is, "a crystalline poly-α-olefin". In this regard, "crystalline" means that normally referred to as "crystalline", and more specifically, refers to a state in which polymers are regularly arranged.

Owing to inclusion of a metallocene polymer (B), the hot melt adhesive agent according to the present invention exhibits improved heat resistance, improved adhesive properties at a high temperature (around 50° C.) and excellent adhesive properties in a broad temperature range from a low temperature (around 4° C.) to a high temperature (around 50° C.).

Examples of the metallocene polymer (B) include a polyethylene, a polypropylene, an ethylene/propylene copolymer, an ethylene/α-olefin copolymer, a propylene/α-olefin copolymer, an ethylene/propylene/α-olefin copolymer, an ethylene/1-butene copolymer, a propylene/1-butene copolymer and an ethylene/propylene/1-butene copolymer.

In the present invention, it is preferable that the metallocene polymer (B) includes a polypropylene. Owing to inclusion of a polypropylene in the component (B), compatibility between the component (B) and the component (A) improves, and the hot melt adhesive agent becomes more excellent in adhesive properties in a broad temperature range from a low temperature (5° C.) to a high temperature (50° C.).

When an α-olefin is polymerized by using a metallocene catalyst, a polymer having very narrow molecular weight distribution is synthesized. Accordingly, there is no case where a bias in crystalline property of poly-α-olefin occurs, and a polymer which has uniformity in molecular organization: for example, arrangement of propylene positions and a constitutional unit other than propylene; and a content ratio of each of constitutional units, is obtained, the possibility that a low-molecular weight molecule which is a cause of decrease in adhesion force is generated becomes lower, and then adhesive force tends not to decrease.

A density of the metallocene polymer (B) is preferably equal to or higher than 0.7 g/cm$^3$, is especially preferably from 0.80 g/cm$^3$ to 0.10 g/cm$^3$, and is most preferably from 0.86 g/cm$^3$ to 0.90 g/cm$^3$.

<Tackifying Resin (C)>

"A tackifying resin (C)" is not particularly limited as long as the tackifying resin (C) is normally used for a hot melt adhesive agent, and the hot melt adhesive agent for which the present invention is intended is capable of being obtained.

Owing to inclusion of a tackifying resin (C) in the above-described ratio, the hot melt adhesive agent exhibits tack to a certain degree, and it is possible to improve balance of adhesive properties from a low temperature (around 4° C.) to a high temperature (around 50° C.).

Examples of the tackifying resin include a natural rosin, a modified rosin, a hydrogenated rosin, a glycerol ester of a natural rosin, a glycerol ester of a modified rosin, a pentaerythritol ester of a natural rosin, a pentaerythritol ester of a modified rosin, a pentaerythritol ester of a hydrogenated rosin, a copolymer of natural terpenes, a terpolymer of natural terpenes, a hydrogenated derivative of a copolymer of hydrogenated terpenes, a polyterpene resin, a hydrogenated derivative of a phenol-based modified terpene resin, an aliphatic petroleum hydrocarbon resin, a hydrogenated derivative of an aliphatic petroleum hydrocarbon resin, an aromatic petroleum hydrocarbon resin, a hydrogenated derivative of an aromatic petroleum hydrocarbon resin, a cycloaliphatic petroleum hydrocarbon resin and a hydrogenated derivative of a cycloaliphatic petroleum hydrocarbon resin. The above-described tackifying resin may be used alone or two or more kinds of the above-described tackifying resins may be used in combination. As a tackifying resin, a tackifying resin of a liquid type may be used as long as the color tone of the tackifying resin is colorless to pale yellow, and the tackifying resin has substantially no odor, and is good in thermal stability. When these characteristics are considered in a comprehensive way, as the tackifying resin, hydrogenated derivatives of the above-described resins are preferable.

As the tackifying resin (C), a commercial product may be used. Examples of the commercial product include ECR231C (trade name), ECR179EX (trade name) and ECR5600 (trade name) manufactured by Exxon Mobil Corporation, MarucaClear-H (trade name) manufactured by Maruzen Petrochemical Co., Ltd., Clearon K100 (trade name), Clearon K4090 (trade name) and Clearon K4100 (trade name) and Clearon P105 (trade name) manufactured by Yasuhara Chemical Co., Ltd., Arkon M100 (trade name) and Arkon P90 (trade name) manufactured by Arakawa Chemical Industries, Ltd., I-MARV S100 (trade name), I-MARV Y135 (trade name), I-MARV P125 (trade name) and I-MARV P100 (trade name) manufactured by Idemitsu Kosan Co., Ltd. as well as Regalite R7100 (trade name) manufactured by Eastman Chemical Company. The above-described commercially available tackifying resin may be used alone or two or more kinds of the above-described commercially available tackifying resins may be used in combination.

<Wax (D)>

In the present invention, it is preferable that the hot melt adhesive agent further comprises a wax (D). Owing to inclusion of a wax (D), the hot melt adhesive agent is capable of retaining appropriate hardness and preventing blocking.

Meanwhile, in the present specification, "a wax" refers to an organic substance which is solid at a normal temperature and becomes liquid when being heated, and has a weight average molecular weight of less than 10,000, and which is generally called "a wax". "A wax" is not particularly limited as long as the wax has a waxy property and the hot melt adhesive agent according to the present invention is capable of being obtained. The wax may, be a synthetic wax or may be a natural wax.

Examples of the synthetic wax include a Fischer-Tropsch wax and a polyolefin wax (for example, a polyethylene wax, a polypropylene wax and a polyethylene/polypropylene wax).

"A Fischer-Tropsch wax" refers to a wax synthesized by the Fischer-Tropsch process which is generally called a Fischer-Tropsch wax. The Fischer-Tropsch wax is obtained by fractionating a wax of which constituent molecules are made to have a narrow carbon number distribution from a wax of which constituent molecules have a relatively broad carbon number distribution.

Examples of the commercially available Fischer-Tropsch wax include Sasol H1 (trade name), Sasol H8 (trade name) and Sasol C80 (trade name) from Sasol Performance Chemicals and FT-115 (trade name) from Nippon Seiro Co., Ltd.

Examples of the natural wax include a paraffin wax, a microcrystalline wax and a petrolatum.

The paraffin wax is a wax which is solid at a normal temperature and is generated by separation from an oil extracted by vacuum distillation. Representative examples of the paraffin wax include Paraffin Wax (trade name) series manufactured by Nippon Seiro Co., Ltd.

The microcrystalline wax is a wax which is solid at a normal temperature and is generated by separation from a vacuum distillation bottom or an extracted heavy oil. Representative examples of the microcrystalline wax include Hi-Mic (trade name) series manufactured by Nippon Seiro Co., Ltd.

The petrolatum is a wax which is semi-solid at a normal temperature and is generated by separation from a vacuum distillation bottom. Representative examples of the petrolatum include Centon CP (trade name) series manufactured by Chuo Yuka Co., Ltd.

It is preferable that the hot melt adhesive agent according to the present invention comprises "a paraffin wax" which is a natural wax. When the hot melt adhesive agent according to the present invention is compounded with a paraffin wax, the hot melt adhesive agent has appropriate hardness, and then resistance to blocking of the hot melt adhesive agent improves, and further, tackiness of the hot melt adhesive agent decreases. Accordingly, a consumer does not feel discomfort when he/she touches the hot melt adhesive agent protruded from an adhesion surface between a packaging body for a straw and a container.

<Oil (E)>

It is preferable that the hot melt adhesive agent according to the present invention comprises an oil. "An oil" is compounded for purposes of decreasing melt viscosity, imparting flexibility and improving wettability to an adher-end of the hot melt adhesive agent. The oil is not particularly limited as long as the oil is compatible with the components (A) and (B), and the hot melt adhesive agent for which the present invention is intended is capable of being obtained. Examples of the oil include a paraffin-based oil, a naphthene-based oil and an aromatic oil. A paraffin-based oil which is colorless and odorless is especially preferable.

When the hot melt adhesive agent according to the present invention is compounded with a paraffin-based oil, adhesive properties from a low temperature (around 4° C.) to a normal temperature (around 23° C.) of the hot melt adhesive agent improve.

A commercial product may be used as the oil. Examples of the commercial product include White Oil Broom 350 (trade name) manufactured by Kukdong Oil & Chemical Co., Ltd., Diana Fresia S32 (trade name), Diana Process Oil PW-90 (trade name) and DN oil KP-68 (trade name) manufactured by Idemitsu Kosan Co., Ltd., Enerper M1930 (trade name) manufactured by BP Chemicals, Kaydol (trade name) manufactured by Crompton Corporation as well as Primol 352 (trade name) manufactured by Exxon Mobil Corporation. The above-described plasticizer may be used alone or two or more kinds of the above-described plasticizers may be used in combination.

The hot melt adhesive agent according to the present invention may further comprise each of various kinds of additives, as necessary. Examples of the various kinds of additives include a stabilizer (an ultraviolet absorber and an antioxidant) and a fine particle filler.

"A stabilizer" is compounded in order to improve stability of the hot melt adhesive agent by preventing reduction in molecular weight due to heat, air and light, gelation, coloring and generation of odor of the hot melt adhesive agent. The stabilizer is not particularly limited as long as the hot melt adhesive agent for which the present invention is intended is capable of being obtained. Examples of the stabilizer include an antioxidant and an ultraviolet absorber.

"An ultraviolet absorber" is used for improving light resistance of the hot melt adhesive agent. "An antioxidant" is used for preventing oxidative degradation of the hot melt adhesive agent. The antioxidant and the ultraviolet absorber are those which are generally used for a hot melt adhesive agent, and are not particularly limited as long as an intended product made of paper as described below is capable of being obtained.

Examples of "the antioxidant" include a phenol-based antioxidant, a sulfur-based antioxidant and a phosphorus-based antioxidant. Examples of the ultraviolet absorber include a benzotriazole-based ultraviolet absorber and a benzophenone-based ultraviolet absorber. In addition, a lactone-based stabilizer may be added. The above-described stabilizer may be used alone or two or more kinds of the above-described stabilizers may be used in combination.

As the stabilizer, a commercial product may be used. Examples of the commercially available stabilizer include Sumilizer GM (trade name), Sumilizer TPD (trade name) and Sumilizer TPS (trade name) manufactured by Sumitomo Chemical Co., Ltd., IRGANOX 1010 (trade name), IRGANOX HP2225FF (trade name), IRGAFOS 168 (trade name) and IRGANOX 1520 (trade name) manufactured by BASF Japan Ltd., ADK STAB AO-60 (trade name) of ADEKA Corporation as well as JF 77 (trade name) and JP-650 (trade name) manufactured by Johoku Chemical Co., Ltd. The above-described stabilizer may be used alone or two or more kinds of the above-described stabilizers may be used in combination.

The hot melt adhesive agent according to the present invention may further comprise a fine particle filler. The fine particle filler may be that generally used, and is not particularly limited as long as the hot melt adhesive agent for which the present invention is intended is capable of being obtained. Examples of "the fine particle filler" include mica, calcium carbonate, kaoline, talc, titanium oxide, diatomaceous earth, a urea-based resin, styrene beads, baked clay and starch. A shape of the above-described fine particle filler is preferably spherical, and a size (a diameter in the case of a sphere) of the above-described fine particle filler is not particularly limited.

The hot melt adhesive agent according to the present invention is manufactured by compounding the amorphous poly-α-olefin (A), the metallocene polymer (B), further, as necessary, the tackifying resin (C), the wax (D), the oil (E) and the above-described each of various kinds of additives, by using a generally known method for manufacturing a hot melt adhesive agent.

The hot melt adhesive agent according to the present invention comprises from 20 to 60 parts by weight, preferably from 30 to 50 parts by weight and more preferably from 35 to 45 parts by weight of the amorphous poly-α-olefin (A) based on 100 parts by weight of a total weight of (A) to (E).

The hot melt adhesive agent according to the present invention comprises from 10 to 50 parts by weight, preferably from 20 to 40 parts by weight and more preferably from 20 to 30 parts by weight of the crystalline poly-α-olefin (B) based on 100 parts by weight of a total weight of (A) to (E).

The hot melt adhesive agent according to the present invention comprises from 5 to 30 parts by weight, preferably from 10 to 25 parts by weight and more preferably from 10 to 20 parts by weight of the tackifying resin (C) based on 100 parts by weight of a total weight of (A) to (E).

Owing to having the above-described compounding composition, it becomes possible that the hot melt adhesive agent according to the present invention is excellent in adhesive properties to a substrate material of a container, is especially excellent in adhesive properties to substrate material of paper, is significantly excellent in balance of adhesive properties in a broad temperature range from a low temperature (around 4° C.) to a high temperature (around 50° C.), is easy to keep viscosity constant even when being stored in a tank at a high temperature for a long period of time, and has little viscosity change.

For example, the hot melt adhesive agent according to the present invention may be manufactured by compounding certain amounts of the above-described components, and heating and melting the above-described components. An order of addition of each of the components and a method for heating the components are not particularly limited as long as the hot melt adhesive agent for which the present invention is intended is capable of being obtained.

The hot melt adhesive agent according to the present invention comprises the components (A) to (C), and has a melt viscosity at 180° C. of equal to or lower than 3,000 mPa·s, preferably from 200 to 2,500 mPa·s, and especially desirably from 800 to 2,000 mPa·s. Owing to the melt viscosity being within the above-described range, the hot melt adhesive agent becomes excellent in coating property.

In the present specification, a melt viscosity at 180° C. refers to a value measured by using a Brookfield viscometer, a rotor No. 27 and a Thermocell.

The hot melt adhesive agent according to the present invention may take various shapes, but the hot melt adhesive agent is generally, at a normal temperature, block-shaped. The block-shaped hot melt adhesive agent may be obtained by cooling and solidifying a product obtained by the above-described manufacturing method as it is.

The hot melt adhesive agent according to the present invention may be used by being coated on an adherend. When coating is performed, the hot melt adhesive agent is not required to be compounded with an organic solvent, and therefore, the hot melt adhesive agent according to the present invention is also environmentally preferable.

As a method for coating, a generally well-known method for applying (or coating) a hot melt adhesive agent may be used. The generally well-known methods are classified roughly into contact coating and non-contact coating. The "contact coating" refers to a method for coating in which when a hot melt adhesive agent is coated, a jetting machine is made in contact with a member and a film. The "non-contact coating" refers to a method for coating in which when a hot melt adhesive agent is coated, a jetting machine is not made in contact with a member or a film. Examples of the method for contact coating include coating with a slot coater and coating with a roll coater. Examples of the method for non-contact coating include spiral coating in which coating may be performed spirally, omega coating and controlled seam coating in which coating may be performed in a wavelike pattern, slot spray coating and curtain spray coating in which coating may be performed in a plane manner, dot coating in which coating may be performed in a dotted manner and bead coating in which coating may be performed linearly.

The hot melt adhesive agent according to the present invention is used for manufacturing a container with a straw, and therefore, the method for coating the hot melt adhesive agent according to the present invention is most preferably dot coating in which coating may be performed in a dotted manner.

Coating of the hot melt adhesive agent by dot coating is performed at from 120° C. to 200° C. on a side of a packaging body for a straw or a side of a container such that the packaging body for the straw is attached to the container through the hot melt adhesive agent, and therefore, the container with the straw may be preferably obtained.

FIG. 1 is a perspective view which schematically shows a paper pack that is one embodiment of the container with the straw according to the present invention. As shown in this figure, a straw piercing port 3 is formed on an upper surface 2 of a container with a straw 1. A packaging body for a straw 6 is retained to one side of the container with the straw 1 by a hot melt adhesive agent 4. The packaging body for the straw 6 encloses a straw 5 with a film such as a polyolefin.

Examples of the paper pack include that manufactured from a substrate material in which a polyolefin is coated thinly on both sides of paper. With regard to a thickness of a polyolefin layer, a thickness of an outer side is from about 16 to about 20 µm, and a thickness of an inner side that a liquid touches is thick as thick as from about 26 to about 30 µm in order to prevent leakage. A thickness of paper is about 480 µm. Examples of the paper include that obtained from a virgin pulp which is mainly composed of conifer tree pulp to which broad leaf tree pulp is blended. Examples of the polyolefin include a polyethylene and a polypropylene.

Examples of the straw include that manufactured from a polyolefin material. Examples of the packaging body for the straw include that manufactured from a polyolefin film. Examples of the polyolefin include a polyethylene and a polypropylene.

Figure 2:
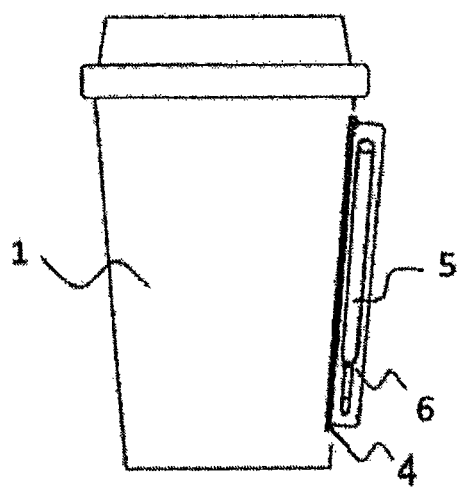
FIG. 2 is a front view which schematically shows a container with a straw (a plastic cup).

FIG. 2 is a front view which schematically shows a plastic cup that is another embodiment of the container with the straw according to the present invention. As shown in this figure, a packaging body for a straw 6 which houses a straw 5 is attached to one side of a container with a straw 1 (a plastic substrate material) through a hot melt adhesive agent (not shown in the figure). Examples of the plastic substrate material include a polypropylene and a polyethylene.

A container with a straw is not limited to the embodiments shown in FIGS. 1 and 2. For example, the container may be a metal can (such as an aluminum can and a steel can) made of metal, and further, may be a container to which a straw is directly attached without using a packaging body for a straw.

Examples

The present invention is described in more specifically and in more detail hereinbelow by Examples and Comparative Examples, but these Examples are only aspects of the present invention, and the present invention is not limited by these Examples in any way. Meanwhile, in descriptions of Examples, unless otherwise specified, a portion which does not consider a solvent serves as a reference of part(s) by weight and % by weight.

Components which were used in the present Examples are shown hereinbelow.

Amorphous Poly-α-Olefin (A)

(A1) An amorphous propylene homopolymer (Eastoflex P1010PL (trade name), manufactured by Eastman Chemical Company, a viscosity of 1,000 mPa·s: 190° C., a softening point of 155° C., a density of 0.87 g/cm$^3$)

(A2) An amorphous propylene/ethylene/1-butene copolymer (VESTOPLAST 703 (trade name), manufactured by Evonik Industries, a viscosity of 2,700 mPa·s: 190° C., a softening point of 124° C., a density of 0.87 g/cm$^3$)

(A3) An amorphous propylene/ethylene/1-butene copolymer (VESTOPLAST 704 (trade name), manufactured by Evonik Industries, a viscosity of 3,500 mPa·s: 190° C., a softening point of 105° C., a density of 0.87 g/cm$^3$)

(A4) An amorphous propylene/ethylene/1-butene copolymer (VESTOPLAST 708 (trade name), manufactured by Evonik Industries, a viscosity of 8,000 mPa·s: 190° C., a softening point of 106° C., a density of 0.87 g/cm$^3$)

(A5) An amorphous propylene/1-butene copolymer (Lexan Tack 2715A (trade name), manufactured by Huntsman Corporation, a viscosity of 1,500 mPa·s: 190° C., a softening point of 110° C., a density of 0.87 g/cm$^3$)

(A6) An amorphous propylene/1-butene copolymer (Lexan Tack 2780A (trade name), manufactured by Huntsman Corporation, a viscosity of 8,000 mPa·s: 190° C., a softening point of 110° C., a density of 0.87 g/cm$^3$)

(A'7) An SBS (TUFPRENE A (trade name), manufactured by Asahi Kasei Corporation, a content ratio of styrene of 40% by weight)

(A'8) An SBS (TUFPRENE 125 (trade name), manufactured by Asahi Kasei Corporation, a content ratio of styrene of 40% by weight)

(A'9) An EVA (Ultracene 735 (trade name), manufactured by Tosoh Corporation, an MFR of 1,000 g/10 min: 190° C., a content ratio of vinyl acetate of 28%, a density of 0.96 g/cm$^3$)

Metallocene Polymer (B)

(B1) A polypropylene homopolymer (L-MODU S400 (trade name), manufactured by Idemitsu Kosan Co., Ltd., an MFR of 2,000 g/10 min: 230° C., a density of 0.87 g/cm$^3$), a polymer obtained by polymerization by using a metallocene catalyst (B2) A polypropylene homopolymer (L-MODU S600 (trade name), manufactured by Idemitsu Kosan Co., Ltd., an MFR of 350 g/10 min: 230° C., a density of 0.87 g/cm$^3$), a polymer obtained by polymerization by using a metallocene catalyst (B3) An ethylene/octene copolymer (AFFINITY GA1900 (trade name), manufactured by The Dow Chemical Company, an MFR of 1,000 g/10 min: 190° C., a density of 0.87 g/cm$^3$), a polymer obtained by polymerization by using a metallocene catalyst (B4) A propylene/ethylene copolymer (Vistamaxx 6202 (trade name), manufactured by Exxon Mobil Corporation, an MFR of 20 g/10 min: 230° C., a density of 0.86 g/cm$^3$), a polymer obtained by polymerization by using a metallocene catalyst (B5) A propylene/ethylene copolymer (Licocene PP 2602 (trade name), manufactured by Clariant, a viscosity of 60 mPa·s: 170° C., a density of 0.90 g/cm$^3$), a polymer obtained by polymerization by using a metallocene catalyst (B'6) A polyethylene homopolymer (Petrocene 249 (trade name), manufactured by Tosoh Corporation, an MFR of 70 g/10 min: 190° C., a density of 0.92 g/cm$^3$), a polymer obtained by polymerization by using a Ziegler-Natta catalyst (B'7) An ethylene/polybutene copolymer (DP8911ME (trade name), manufactured by LyondellBasell Industries, an MFR of 200 g/10 min: 190° C., a density of 0.90 g/cm$^3$), a polymer obtained by polymerization by using a Ziegler-Natta catalyst Tackifying Resin (C)

(C1) A hydrogenated dicyclopentadiene based resin (I-MARV P100 (trade name), manufactured by Idemitsu Kosan Co., Ltd., a softening point of 100° C.)

(C2) A hydrogenated cycloaliphatic petroleum hydrocarbon resin (Arkon P90 (trade name), manufactured by Arakawa Chemical Industries, Ltd., a softening point of 90° C.)

(C3) A hydrogenated terpene resin (Clearon P105 (trade name), manufactured by Yasuhara Chemical Co., Ltd., a softening point of 105° C.)

Wax (D)

(D1) A paraffin wax (Paraffin Wax-150 (trade name), manufactured by Nippon Seiro Co., Ltd.)

(D2) A Fischer-Tropsch wax (Sasol H8 (trade name), manufactured by Sasol) (D3) A microcrystalline wax (Microwax 180 (trade name), manufactured by JXTG Nippon Oil & Energy Corporation)

Oil (E)

(E1) A paraffin oil (Diana Fresia S32 (trade name), manufactured by Idemitsu Kosan Co., Ltd.)

(E2) A paraffin oil (Phazol 35 (trade name), manufactured by SK Lubricants Co., Ltd.)

(E3) A naphthene oil (SUNPURE N90 (trade name), manufactured by Japan Sun Oil Co., Ltd.)

Stabilizer (F)

(F1) An antioxidant (ADK STAB AO-60 (trade name), manufactured by ADEKA Corporation)

<Manufacture of Hot Melt Adhesive Agent>

Components (A) to (F) were heated, melted and mixed with each other at about 145° C. for about 1.5 hours by using a universal stirrer at a ratio (parts by weight) shown in Table 1 to manufacture the hot melt adhesive agent of each of Examples and Comparative Examples.

With regard to the above-described hot melt adhesive agent, a melt viscosity and a maintaining ratio of a viscosity, adhesive performance to a paper pack (4° C., 23° C., 50° C.) and resistance to blocking were evaluated.

A method for preparing an evaluation sample, evaluation test methods and evaluation criteria are described hereinbelow.

<Measurement of Viscosity>

A hot melt adhesive agent was melted at each temperature of 180° C., and after 20 minutes, a viscosity was measured by using a Brookfield viscometer and a rotor No. 27. The viscosity was measured in accordance with the method B defined in JAI7-1991.

<Maintaining Ratio of Viscosity>

A viscosity (180° C.) of a hot melt adhesive agent of each of Examples and Comparative Examples was measured, and the hot melt adhesive agent was made to be an initial sample. Twenty grams of the hot melt adhesive agent (the initial sample) was put into a 70 ml glass container, and was left to stand in a thermostat at 180° C. for 72 hours, and the sample was made to be a sample with lapse of time.

A viscosity of the sample with lapse of time was measured in accordance with the method B defined in JAI7-1991, and a maintaining ratio of a viscosity was calculated by using the following calculation formula.

$$\frac{\text{Viscosity of sample with lapse of time}}{\text{Viscosity of initial sample}} \times 100 = $$ [Numerical Formula 1]

Maintaining ratio of viscosity (%)

The evaluation criteria were as follows.

○: A maintaining ratio of a viscosity was from 80% to 120%, and there was no change in condition.

x: A maintaining ratio of a viscosity was less than 80% or more than 120%, or there was a change in condition.

In the present specification, "a change in condition" is defined as occurrence of any of a ring, a skin and phase separation in a sample with lapse of time within a glass container. The meaning of each term which shows a molten state is as follows.

Ring: a state in which a deteriorated product of a hot melt adhesive agent precipitates annularly on a wall surface of a glass container;

Skin: a state in which a deteriorated product of a hot melt adhesive agent forms a film on a liquid surface;

Phase separation: a state in which a hot melt adhesive agent is separated to form two or more layers.

<Evaluation of Adhesive Strength>

(Preparation of Sample)

From 0.03 to 0.04 g of a hot melt adhesive agent was coated on a paper pack that was an adherend (or a substrate material) by using a hot melt gun. The coating temperature was 180° C. The adherend on which the hot melt adhesive agent was coated and a packaging body for a straw made of a polypropylene were overlaid and were pressed by a hand finger. The obtained sample was made to be a sample for evaluation.

The sample for evaluation of an adhesive strength at a high temperature, a normal temperature or a low temperature was left to stand at room temperature (23° C.) for 24 hours, and thereafter, was used for evaluation.

(Testing Method)

A peel test was conducted on the sample for evaluation of adhesive strength prepared as described above by using a universal tensile testing machine (manufactured by Shimadzu Corporation) at a rate of 300 mm/min. With regard to each of the hot melt adhesive agents (Examples and Comparative Examples), at least three samples were subjected to the measurement, and values of adhesive strengths of the three samples were obtained. An average value of these values was calculated to give a value of an average adhesive strength (also referred to only as "an adhesive strength"). The measurement was conducted at each of temperatures of 4° C., 23° C. and 50° C. Adhesive strengths were evaluated as follows.

A (Excellent): an average adhesive strength was equal to or more than 15 N;

B (Good): an average adhesive strength was equal to or more than 8 N and less than 15 N;

C (Unallowable): an average adhesive strength was less than 8 N.

<Evaluation of Resistance to Blocking>

A hot melt adhesive agent was made to be a sheet with a thickness of 5 mm and two sheets each having a size of 25 millimeters square were cut out. The cut two sheets were overlaid, and were left stand in a state in which hot melt sheets were overlaid to which a load of 1 kg was applied at 23° C. for 24 hours. Thereafter, two hot melt sheets were peeled by hand, and the state of the hot melt sheets was confirmed. The evaluation criteria were as follows.

○: Two sheets were capable of being easily peeled;

Δ: two sheets adhered to each other to some degrees, but they were capable of being peeled at the interface of them;

x: when two sheets were peeled, cohesion failure of the hot melt occurred. Alternatively, two sheets were not capable of being peeled.

TABLE 1

| Composition of adhesive agent | | | Examples | | | | | |
|---|---|---|---|---|---|---|---|---|
| | | | 1 | 2 | 3 | 4 | 5 | 6 |
| Amorphous poly-α-olefin (A) | A1(PP) | | 10 | 15 | 12 | 12 | | 13 |
| | A2(PP/PE/1-Butene) | | 30 | 30 | | | 30 | 27 |
| | A3(PP/PE/1-Butene) | | | | 30 | | 20 | |
| | A4(PP/PE/1-Butene) | | | | | 30 | | |
| | A5(PP/1-Butene) | | | | | | | |
| | A6(PP/1-Butene) | | | | | | | |
| Non-olefin (A') | A'7(SBS) | | | | | | | |
| | A'8(SBS) | | | | | | | |
| | A'9(EVA[1]) | | | | | | | |
| Metallocene polymer (B) | B1(PP) | | 26 | 23 | 26 | | | 26 |
| | B2(PP) | | | | | | | |
| | B3(PE/Octene) | | | | | 28 | | |
| | B4(PP/PE) | | | | | | | |
| | B5(PP/PE) | | | | | | 20 | |
| Non-metallocene polymer (B') | B'6(PE) | | | | | | | |
| | B'7(PE/Polybutene) | | | | | | | |
| Tackifying resin (C) | C1(DCPD[2]) | | 13 | 13 | | 10 | | |
| | C2(C9[3]) | | | | 10 | | 16 | |
| | C3(Terpene) | | | | | | | 13 |
| Wax (D) | D1(Paraffin) | | 7 | 7 | | | 14 | 6 |
| | D2(FT[4]) | | | | 8 | | | 1 |
| | D3(Micro[5]) | | | | | 7 | | |
| Oil (E) | E1(Paraffin) | | 14 | | 14 | | | |
| | E2(Paraffin) | | | 14 | | | | 14 |
| | E3(Naphthene) | | | | | 13 | | |
| Antioxidant (F) | F1(Antioxidant) | | 0.5 | 0.5 | 0.5 | 0.5 | 0.5 | 0.5 |
| Total | | | 100.5 | 100.5 | 100.5 | 100.5 | 100.5 | 100.5 |

[1]Ethylene-vinyl acetate copolymer
[2]Hydrogenated dicyclopentadiene based resin
[3]Hydrogenated cycloaliphatic petroleum hydrocarbon resin
[4]Fischer-Tropsch wax
[5]Microcrystalline wax

TABLE 2

| Property of adhesive agent | | Examples | | | | | |
|---|---|---|---|---|---|---|---|
| | | 1 | 2 | 3 | 4 | 5 | 6 |
| Stability | Initial viscosity @180° C. (mPa·s) | 1034 | 1105 | 1163 | 1635 | 1203 | 1045 |
| | Viscosity after 180° C. × 3 days (mPa·s) | 990 | 1100 | 1080 | 1588 | 1200 | 1030 |
| | Change in condition after 180° C. × 3 days | No abnormality | No abnormality | No abnormality | No abnormality | No abnormality | No abnormality |
| | Maintaining ratio of viscosity (%) | 95.7 | 99.5 | 92.9 | 97.1 | 99.8 | 98.6 |
| | Evaluation | ○ | ○ | ○ | ○ | ○ | ○ |
| Resistance to blocking | 4° C. | 26.6 | 13.5 | 18.6 | 31.6 | 8.5 | 18.6 |
| | 23° C. | 25.7 | 17.9 | 14.5 | 26.5 | 10.0 | 38.1 |
| | 50° C. | 24.6 | 30.8 | 26.6 | 11.0 | 26.5 | 33.2 |
| | 4° C. | A | B | A | A | B | A |
| | 23° C. | A | A | B | A | B | A |
| | 50° C. | A | A | A | B | A | A |
| | Evaluation of resistance to blocking | ○ | ○ | ○ | ○ | ○ | ○ |

TABLE 3

| Composition of adhesive agent | | Examples | | | | | |
|---|---|---|---|---|---|---|---|
| | | 7 | 8 | 9 | 10 | 11 | 12 |
| Amorphous poly-α-olefin (A) | A1(PP) | | | | 14 | | |
| | A2(PP/PE/1-Butene) | 40 | | | | 40 | |
| | A3(PP/PE/1-Butene) | | | | | | 50 |
| | A4(PP/PE/1-Butene) | | | | | | |
| | A5(PP/1-Butene) | | 28 | | | | |
| | A6(PP/1-Butene) | | | 28 | 28 | | |
| Non-olefin (A') | A'7(SBS) | | | | | | |
| | A'8(SBS) | | | | | | |
| | A'9(EVA[1]) | | | | | | |
| Metallocene polymer (B) | B1(PP) | | 26 | | 20 | | |
| | B2(PP) | | | | | 24 | |
| | B3(PE/Octene) | | 17 | 34 | | | 30 |
| | B4(PP/PE) | 14 | | | | | |
| | B5(PP/PE) | | | | | | |
| Non-metallocene polymer (B') | B'6(PE) | | | | | | |
| | B'7(PE/Polybutene) | | | | | | |
| Tackifying resin (C) | C1(DCPD[2]) | | 13 | 18 | 18 | 18 | |
| | C2(C9[3]) | 18 | | | | | |
| | C3(Terpene) | | | | | | |
| Wax (D) | D1(Paraffin) | 10 | 10 | 12 | 12 | | 8 |
| | D2(FT[4]) | | | | | | |
| | D3(Micro[5]) | | | | | | |
| Oil (E) | E1(Paraffin) | 18 | 6 | 8 | 8 | 18 | 12 |
| | E2(Paraffin) | | | | | | |
| | E3(Naphtene) | | | | | | |
| Antioxidant (F) | F1(Antioxidant) | 0.5 | 0.5 | 0.5 | 0.5 | 0.5 | 0.5 |
| Total | | 100.5 | 100.5 | 100.5 | 100.5 | 100.5 | 100.5 |

[1]Ethylene-vinyl acetate copolymer
[2]Hydrogenated dicyclopentadiene based resin
[3]Hydrogenated cycloaliphatic petroleum hydrocarbon resin
[4]Fischer-Tropsch wax
[5]Microcrystalline wax

TABLE 5

| Composition of adhesive agent | | Comparative Examples | | | | | |
|---|---|---|---|---|---|---|---|
| | | 1 | 2 | 3 | 4 | 5 | 6 |
| Amorphous poly-α-olefin (A) | A1(PP) | | | | | | 10 |
| | A2(PP/PE/I-Butene) | | | | | 30 | 10 |
| | A3(PP/PE/1-Butene) | | | | | | |
| | A4(PP/PE/1-Butene) | | | | | | |
| | A5(PP/1-Butene) | | | | | | |
| | A6(PP/1-Butene) | | | | | | |
| Non-olefin (A') | A'7(SBS) | 24 | | | | | |
| | A'8(SBS) | | 24 | | | | |
| | A'9(EVA[1]) | | | 66 | 40 | | |
| Metallocene polymer (B) | B1(PP) | | 26 | | 26 | | |
| | B2(PP) | | | | | | |
| | B3(PE/Octene) | | | | | | |
| | B4(PP/PE) | | | | | | |
| | B5(PP/PE) | | | | | | |
| Non-metallocene polymer (B') | B'6(PE) | | | | | 33 | |
| | B'7(PE/Polybutene) | | | | | | 48 |
| Tackifying resin (C) | C1(DCPD[2]) | 44 | 18 | | | 13 | 10 |
| | C2(C9[3]) | | | 12 | 12 | | |
| | C3(Terpene) | | | | | | |
| Wax (D) | D1(Paraffin) | 10 | 14 | 10 | 10 | 14 | |
| | D2(FT[4]) | | | | | | 12 |
| | D3(Micro[5]) | | | | | | |
| Oil (E) | E1(Paraffin) | | | 12 | 12 | 10 | 10 |
| | E2(Paraffin) | | | | | | |
| | E3(Naphtene) | 22 | 18 | | | | |
| Antioxidant (F) | F1(Antioxidant) | 0.5 | 0.5 | 0.5 | 0.5 | 0.5 | 0.5 |
| Total | | 100.5 | 100.5 | 100.5 | 100.5 | 100.5 | 100.5 |

[1]Ethylene-vinyl acetate copolymer
[2]Hydrogenated dicyclopentadiene based resin
[3]Hydrogenated cycloaliphatic petroleum hydrocarbon resin
[4]Fischer-Tropsch wax
[5]Microcrystalline wax

TABLE 4

| Property of adhesive agent | | Examples | | | | | |
|---|---|---|---|---|---|---|---|
| | | 7 | 8 | 9 | 10 | 11 | 12 |
| Stability | Initial viscosity @180° C. (mPa·s) | 1700 | 1760 | 1190 | 1155 | 2645 | 1780 |
| | Viscosity after 180° C. × 3 days | 1650 | 1720 | 1150 | 1105 | 2550 | 1720 |
| | Change in condition after 180° C. × 3 days | No abnormality | No abnormality | No abnormality | No abnormality | No abnormality | No abnormality |
| | Maintaining ratio of viscosity (%) | 97.1 | 97.7 | 96.6 | 95.7 | 96.4 | 96.6 |
| | Evaluation | ○ | ○ | ○ | ○ | ○ | ○ |
| Resistance to blocking | 4° C. | 34.4 | 11.5 | 17.6 | 10.7 | 16.0 | 13.8 |
| | 23° C. | 22.1 | 33.9 | 10.3 | 9.3 | 26.6 | 10.2 |
| | 50° C. | 18.7 | 14.3 | 10.3 | 21.8 | 20.9 | 14.2 |
| | 4° C. | A | B | A | B | A | B |
| | 23° C. | A | A | B | A | A | B |
| | 50° C. | A | B | B | A | A | B |
| | Evaluation of resistance to blocking | Δ | ○ | ○ | ○ | Δ | ○ |

TABLE 6

| Property of adhesive agent | | Comparative Examples | | | | | |
|---|---|---|---|---|---|---|---|
| | | 1 | 2 | 3 | 4 | 5 | 6 |
| Stability | Initial viscosity @180° C. (mPa · s) | 1075 | 1925 | 1598 | 3280 | 5200 | 4225 |
| | Viscosity after 180° C. × 3 days | 275 | — | 1588 | — | 5100 | 4110 |
| | Change in condition after 180° C. × 3 days | Ring | Separation | No abnormality | Separation, ring | No abnormality | No abnormality |
| | Maintaining ratio of viscosity (%) | 25.6 | — | 99.4 | — | 98.1 | 97.3 |
| | Evaluation | X | X | O | X | O | O |
| Resistance to blocking | 4° C. | 10.3 | 3.6 | 0.3 | 3.2 | 4.2 | 5.5 |
| | 23° C. | 8.2 | 13.0 | 12.1 | 9.7 | 9.5 | 6.5 |
| | 50° C. | 0.5 | 25.4 | 0.2 | 0.3 | 13.2 | 1.2 |
| | 4° C. | B | C | C | C | C | C |
| | 23° C. | B | B | B | B | B | C |
| | 50° C. | C | A | C | C | B | C |
| | Evaluation of resistance to blocking | X | O | O | O | O | O |

TABLE 7

| Composition of adhesive agent | | Comparative Examples | |
|---|---|---|---|
| | | 7 | 8 |
| Amorphous poly-α-olefin (A) | A1(PP) | 12 | |
| | A2(PP/PE/1-Butene) | | |
| | A3(PP/PE/1-Butene) | | 56 |
| | A4(PP/PE/1-Butene) | | |
| | A5(PP/1-Butene) | | |
| | A6(PP/1-Butene) | | |
| Non-olefin (A') | A'7(SBS) | | |
| | A'8(SBS) | | |
| | A'9(EVA$^1$) | | |
| Metallocene polymer (B) | B1(PP) | 68 | |
| | B2(PP) | | |
| | B3(PE/Octene) | | |
| | B4(PP/PE) | | |
| | B5(PP/PE) | | |
| Non-metallocene polymer (B') | B'6(PE) | | |
| | B'7(PE/Polybutene) | | |
| Tackifying resin (C) | C1(DCPD$^2$) | 12 | |
| | C2(C9$^3$) | | 10 |
| | C3(Terpene) | | |
| Wax (D) | D1(Paraffin) | 12 | |
| | D2(FT$^4$) | | 8 |
| | D3(Micro$^5$) | | |
| Oil (E) | E1(Paraffin) | 8 | 14 |
| | E2(Paraffin) | | |
| | E3(Naphtene) | | |
| Antioxidant (F) | F1(Antioxidant) | 0.5 | 0.5 |
| Total | | 100.5 | 100.5 |

$^1$Ethylene-vinyl acetate copolymer
$^2$Hydrogenated dicyclopentadiene based resin
$^3$Hydrogenated cycloaliphatic petroleum hydrocarbon resin
$^4$Fischer-Tropsch wax
$^5$Microcrystalline wax

TABLE 8

| Property of adhesive agent | | Comparative Examples | |
|---|---|---|---|
| | | 7 | 8 |
| Stability | Initial viscosity @180° C. (mPa · s) | 2725 | 973 |
| | Viscosity after 180° C. × 3 days | 990 | 827.5 |
| | Change in condition after 180° C. × 3 days | Ring • skin | No abnormality |
| | Maintaining ratio of viscosity (%) | 36.3 | 85.0 |
| | Evaluation | x | ○ |
| Resistance to blocking | 4° C. | 0.5 | 35.6 |
| | 23° C. | 2.2 | 20.9 |
| | 50° C. | 8.2 | 7.8 |
| | 4° C. | C | A |
| | 23° C. | C | A |
| | 50° C. | B | C |
| | Evaluation of resistance to blocking | ○ | Δ |

INDUSTRIAL APPLICABILITY

The present invention provides a hot melt adhesive agent for a container with a straw and a container with a straw which is obtained by being coated with the hot melt adhesive agent. The hot melt adhesive agent according to the present invention is excellent in adhesive properties to a paper pack and a plastic cup in a broad temperature range from a low temperature to a high temperature, and it is possible to decrease a maintaining ratio of a viscosity. Further, the hot melt adhesive agent according to the present invention is also excellent in resistance to blocking. Accordingly, the hot melt adhesive agent according to the present invention is suitable for manufacturing a container with a straw, in particular, a paper pack container.

DESCRIPTION OF REFERENCE NUMERALS AND SIGNS

1: Container with straw
2: Upper surface
3: Straw piercing port
4: Hot melt adhesive agent
5: Straw
6: Packaging body for straw

The invention claimed is:

1. A hot melt adhesive agent for a container with a straw consisting of:
   (A) an amorphous poly-α-olefin selected from the group consisting of polypropylene homopolymer, polypropylene-polyethylene-1-butene copolymer, polypropylene-1-butene copolymer, and mixtures thereof;
   (B) a metallocene polymer selected from the group consisting of polypropylene homopolymer, polypropylene-octene copolymer, polypropylene-polyethylene, and mixtures thereof;
   (C) a tackifying resin;
   (D) a wax;
   (E) an oil; and
   (F) optionally an additive.

2. A container with a straw, to which a straw is retained by the hot melt adhesive agent according to claim 1.

3. The hot melt adhesive agent for the container with the straw according to claim 1, wherein
   the amorphous poly-α-olefin (A) is present from 30 to 50, parts by weight;

the metallocene polymer (B) is present from 20 to 40 parts by weight;
the tackifying resin (C) is present from 5 to 30 parts by weight; and
wherein the parts by weight is based on 100 parts by weight of a total weight of (A) to (E).

4. A container with a straw, to which a straw is retained by the hot melt adhesive agent according to claim 1.

* * * * *